(12) United States Patent
Hampel (10) Patent No.: US 8,356,127 B2
(45) Date of Patent: Jan. 15, 2013

(54) MEMORY INTERFACE WITH WORKLOAD ADAPTIVE ENCODE/DECODE

(75) Inventor: Craig E. Hampel, Los Altos, CA (US)

(73) Assignee: Rambus Inc., Sunnyvale, CA (US)

( * ) Notice: Subject to any disclaimer, the term of this patent is extended or adjusted under 35 U.S.C. 154(b) by 1356 days.

(21) Appl. No.: 11/010,068

(22) Filed: Dec. 9, 2004

(65) Prior Publication Data

US 2006/0129728 A1 Jun. 15, 2006

(51) Int. Cl.
*G06F 13/36* (2006.01)
*G06F 13/362* (2006.01)
*G06F 13/00* (2006.01)
*G06F 13/28* (2006.01)

(52) U.S. Cl. .......................... 710/118; 711/167; 711/169

(58) Field of Classification Search .................. 710/118; 711/167, 169
See application file for complete search history.

(56) References Cited

U.S. PATENT DOCUMENTS

| | | | | |
|---|---|---|---|---|
| 5,295,159 | A * | 3/1994 | Kerpez | 375/260 |
| 5,454,093 | A | 9/1995 | Abdulhafiz et al. | |
| 5,793,949 | A * | 8/1998 | Yusuki et al. | 714/48 |
| 5,808,629 | A * | 9/1998 | Nally et al. | 345/539 |
| 6,006,296 | A * | 12/1999 | Gold et al. | 710/100 |
| 6,253,276 | B1 * | 6/2001 | Jeddeloh | 711/5 |
| 6,366,992 | B2 * | 4/2002 | Manning | 711/167 |
| 6,370,631 | B1 | 4/2002 | Dye | |
| 6,577,689 | B1 * | 6/2003 | Smith et al. | 375/354 |
| RE38,244 | E * | 9/2003 | Han et al. | 375/242 |
| 6,662,240 | B1 * | 12/2003 | Siefert | 710/8 |
| 6,681,228 | B2 * | 1/2004 | Balogh | 707/10 |
| 6,745,308 | B2 * | 6/2004 | Frank et al. | 711/169 |
| 6,946,982 | B1 * | 9/2005 | Mu et al. | 341/50 |
| 2002/0124142 | A1 | 9/2002 | Har et al. | 711/143 |
| 2005/0018774 | A1 * | 1/2005 | Winger et al. | 375/240.23 |
| 2006/0031671 | A1 * | 2/2006 | Schmit | 713/160 |
| 2006/0062302 | A1 * | 3/2006 | Yin et al. | 375/240.16 |

FOREIGN PATENT DOCUMENTS

| | | | |
|---|---|---|---|
| EP | 405318 | A2 * | 6/1990 |
| EP | 514664 | A2 * | 11/1992 |
| EP | 1006438 | A1 * | 7/2000 |

(Continued)

OTHER PUBLICATIONS

"NN9301335: Handling Address Generate Interlocked Distribution without Message Delay", Jan. 1, 1993, IBM, IBM Technical Disclosure Bulletin, vol. 36, Iss. 1, pp. 335-337.*

(Continued)

*Primary Examiner* — Faisal M Zaman
(74) *Attorney, Agent, or Firm* — Morgan, Lewis & Bockius LLP (57) ABSTRACT

A communication interface (e.g., a memory interface) includes a data processing channel adapted to be coupled to a data source and having multiple data processing stages. A bypass network or pipeline is coupled to the data processing channel and configurable to bypass at least one stage in the data processing channel. A controller is coupled to the bypass network for configuring the bypass network to bypass at least one stage of the data processing channel based on performance criteria. In some embodiments or modes of operation, the bypass network is configured to bypass at least one stage of the data processing channel to reduce idle latency after an idle period. In an alternative embodiment or mode of operation, the bypass channel is configured to include at least one stage of the data processing channel to increase data throughput.

27 Claims, 5 Drawing Sheets

FOREIGN PATENT DOCUMENTS

| | | | | |
|---|---|---|---|---|
| EP | 2146344 | A1 | * | 1/2010 |
| JP | 10275416 | A | * | 10/1998 |
| JP | 2000339987 | A | * | 12/2000 |
| WO | WO 03030522 | A1 | * | 4/2003 |

OTHER PUBLICATIONS

"NA900350: Four-Megabyte Single In-Line Memory Module Implementation Using One-Megabyte X Four-Bit Dynamic Rams", Mar. 1, 1990, IBM, IBM Technical Disclosure Bulletin, vol. 32, Iss. 10A, pp. 50-54.*

"NN680648: Partially Encoded Address Mapping Device", Jun. 1, 1968, IBM, IBM Technical Disclosure Bulletin, vol. 11, Iss. 1, pp. 48-49.*

International Search Report for International Application No. PCT/US2005/034264, mailed Oct. 31, 2006.

* cited by examiner

MEMORY INTERFACE WITH WORKLOAD ADAPTIVE ENCODE/DECODE

TECHNICAL FIELD

The disclosed embodiments relate generally to signaling in integrated circuit devices, for example, a memory device and/or a controller device.

BACKGROUND

Modern high-speed interconnect solutions are beginning to employ sophisticated data processing techniques to meet increasingly demanding performance requirements (e.g., high data bandwidth). When applied to memory systems, latency to an initial datum or idle latency is important as well as high data bandwidth. The employment of data processing techniques to improve bandwidth, however, can increase the idle latency of the memory system. A memory system typically has unique requirements that relate to the dynamic nature of its workload. For example, some memory systems have extended periods of idle time where the interconnect is unused. That idle time can allow the communications pipeline to empty. Restarting the communications pipeline and restarting the communication of useful data can take a relatively long time, depending upon the nature of the encoding/decoding algorithms used. After an idle period, the first datum in the communication pipeline typically is used to restart data processing, and the response time to this initial data is important to overall system performance. In this case, the bandwidth of the memory system may be less important than its idle latency (i.e., the amount of time from a memory request until a first datum is received by the requester). Similarly, once the communication pipeline is restarted and the memory system is storing or retrieving significant amounts of data, the idle latency of the memory system may be less important than its bandwidth.

DESCRIPTION OF EMBODIMENTS

As described in more detail below, in several embodiments a memory interface includes a data processing channel adapted to be coupled to a data source and having multiple data processing stages. A bypass network is coupled to the data processing channel and is configurable to bypass at least one stage in the data processing channel. A controller circuit is coupled to the bypass network for configuring the bypass network to bypass at least one stage of the data processing channel in accordance with a latency mode or performance criteria. In some embodiments or modes of operation, the bypass network is configured to bypass at least one stage of the data processing channel to reduce idle latency after an idle period. In an alternative embodiment or mode of operation, the bypass channel is configured to include at least one stage of the data processing channel to increase data throughput.

In some embodiments, a communication interface includes a first data processing channel having a first associated latency, a second data processing channel having a second associated latency, and a selection module coupled to the first and second data processing channels, and configured to couple at least one of the first data processing channel and the second data processing channel to a transmission medium.

Memory Device

Figure 1:
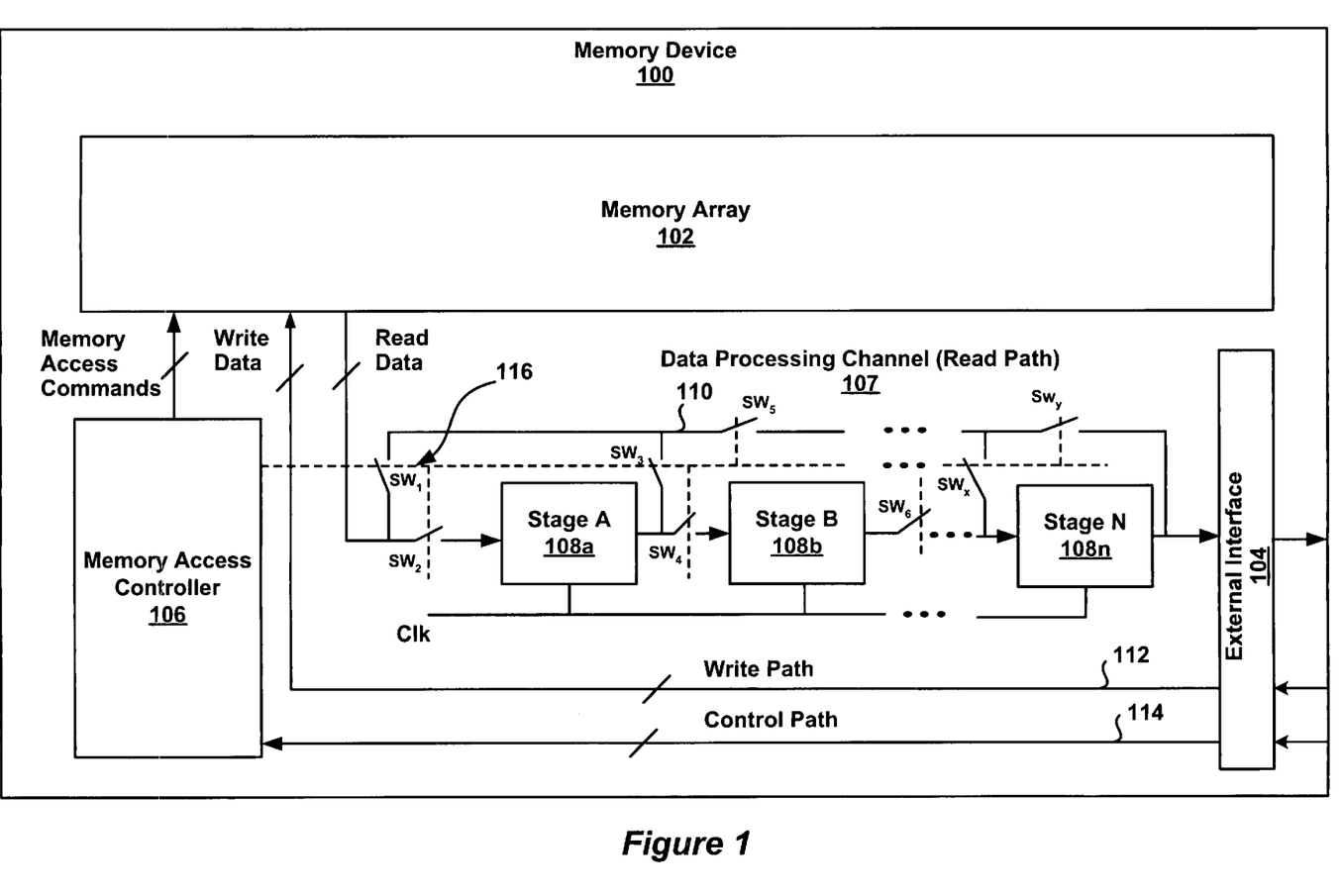
FIG. 1 is block diagram of an embodiment of a memory device with bypass capability.

FIG. 1 is a block diagram of an embodiment of a memory device 100 with bypass capability. The memory device 100 includes a memory array 102, an external interface 104, a memory access controller 106, a data processing channel 107 (e.g., a read path, comprising circuits and signal paths that carry data from the memory core to the interface), a bypass network 110, a write path 112 and a control path 114. In some embodiments, the memory device 100 is a volatile memory device type, such as Dynamic Random Access Memory (DRAM) or Synchronous DRAM (SDRAM). In alternative embodiments, the memory device 100 is a non-volatile memory device type, such as FLASH. The memory device can be a single integrated circuit or part of a memory module, such as a Dual In-line Memory Module (DIMM). While FIG. 1 shows a data processing channel for processing read data, there could also be a data processing channel for processing write data. The desired level of encoding/decoding, however, may be different for write operations than for read operations, depending upon the architecture of the memory device. Additionally system performance is generally less sensitive to the latency of a write operation than the latency of a read operation, so the need to minimize latency in this path is less significant. Note that the disclosed embodiment is not limited to memory interfaces but can be adapted for use in any communication interface that employs data encoding/decoding techniques, including copper based, optical and wireless communication systems.

Memory access requests are received by the memory access controller 106 via control path 114. If a write request is received on control path 114, then write data received on the write path 112 is written to the memory array 102 by the memory access controller 106. If a read request is received on control path 114, then read data is retrieved from the memory array 102 by the memory access controller 106 and provided to the data processing channel 107. The data processing channel 107 processes the read data and sends it back to the requestor via the external interface 104. Write data and read data may share the same external interface on the memory device and may be multiplexed in a bidirectional fashion onto the external data bus.

The memory access controller 106 includes circuitry for asserting row and column addresses and strobes (e.g., RAS, CAS) and/or other access commands and/or clocks depending upon the design architecture of the memory device 100. The external interface 104 includes devices or circuits for conditioning data for transmission on a transmission line or bus in accordance with widely used high-speed bus specifications (e.g., Low Voltage BiCMOS (LVT), Gunning Transfer Logic (GTL+), Stub Series Termination Logic (SSTL_2).

The data processing channel 107, also herein called a pipeline, includes one or more processing stages 108a, ..., 108n (collectively 108), which collectively process the data read from the memory array 102. The data processing channel 107 can be hardware or software, or a combination of both. In some embodiments, the data processing channel 107 performs signal processing on the data to provide increased data throughput or bandwidth. For example, the read data can be compressed using a compression coding technique (e.g., entropy coding) to exploit redundancy in the data stream or encoded into multiple levels (e.g., multi-PAM) or frequencies (e.g., discrete multi-tone) to provide high data rate throughput with reduced common mode noise (e.g., crosstalk, electromagnetic interference). Alternatively, the data may be encoded with error correction codes to negate certain undesirable characteristics of the transmission channel (e.g., intersymbol interference (ISI)). In some embodiments, data encoding could include the addition of a clock signal, which can be recovered by a clock data recovery (CDR) circuit and used to sample incoming data in a receiver. Such techniques may include 8B/10B encoding to ensure sufficient transitions in the serial data stream to enable clock recovery, as well as equal numbers of ones and zeros to maintain DC balance.

The data processing channel 107 is coupled to a bypass network 110, including switches $SW_1$, $SW_2$, $SW_3$, $SW_4$, $SW_5$, $SW_6$, ..., $SW_X$, $SW_Y$. These switches can be selectively activated to bypass one or more stages 108a, ..., 108n based on one or more performance criteria (e.g., latency, bandwidth, etc.). In some embodiments, the bypass network 110 is configured to bypass one or more stages 108a, ..., 108n, in response to a switch control signal 116 received on the control path 114. The switch control signal 116 can be embedded in memory access commands via the control path 114 or transmitted as a separate signal or signals on the control path 114 or on a separate transmission medium.

In an alternative embodiment, a transmitter (e.g., memory device 100) and a receiver (e.g., a memory controller) can have a predetermined policy for configuring the bypass network 110 based on one or more trigger events. For example, a memory device might receive memory access requests that specify a particular latency mode of a plurality of predefined latency modes. Alternately, a memory device might receive memory access requests for which a particular latency mode can be inferred based either on the request or the state of the memory device, or both. Each predefined latency mode represents or corresponds to a respective balance between latency and bandwidth, and furthermore corresponds to a respective encoding level. The encoding level and/or latency mode can be communicated by the memory controller to a memory device, which then uses the latency mode and/or encoding level information to adjust the switches in the bypass network 110 in response to the request.

In some memory system embodiments, there may be extended periods of idle time. This idle time allows the data processing channel 107 to empty. Depending on the number of stages, it can take several clock cycles to restart the data processing channel 107 and start communicating useful data. In a data processing channel with three cycle latency (e.g., three encoding stages), it may take four clock cycles before any useful data is transmitted. Thus, by bypassing one or more stages 108a, ..., 108n, in the data processing channel 107 for the clock cycles immediately following an idle period, useful data can be transmitted at low latency until either the data processing channel 107 is filled or a predefined amount of data has been transmitted using the low latency mode of operation. After the pipeline is filled, or the predefined amount of data has been transmitted, the bypass network 110 is adjusted so as to utilize more or all of the stages 108 of the data processing channel 107, thereby increasing the throughput of the memory system, but increasing the latency. Latency is increased due to the latency contribution of each additional encoding stage 108 that is used when the bypass network 110 is configured to not bypass any of the stages 108 (or to bypass fewer of the stages 108 than in the low latency mode).

Some examples where one or more stages of a data processing channel may be bypassed to decrease latency after an idle period are: multi-level pulse amplitude modulation (PAM) with full swing elimination (FSE), clock data recovery (CDR) codes, multi-tone codes, or data compression codes. An example application includes a memory system that supports 2-level Pulse Amplitude Modulation (PAM) encoding for low latency requests and 4-level PAM encoding for high bandwidth requests. In such an application, the data processing channel might use 2-level PAM encoding for an initial data transfer after an idle time and then switch encoding using 4-level PAM.

The bypass network 110 can be configured using a look-up table (LUT) stored, for example, in cache in the memory access controller 106. By setting the various switches in the bypass network 110, one or more stages are removed from the data processing channel 107. Table I is an example of a switch configuration LUT for a data processing channel including three stages A, B, and C. In this example it is assumed that each stage has a one cycle latency. Note that switches $SW_X$ and $SW_Y$ (as shown FIG. 1) are listed in Table I as switches $SW_7$ and $SW_8$.

TABLE I

Example Switch Configuration Look-Up Table (3-Stage Data Processing Channel)

| Switch Config. No. | $SW_1$ | $SW_2$ | $SW_3$ | $SW_4$ | $SW_5$ | $SW_6$ | $SW_7$ | $SW_8$ | Included Stages | Latency (clock cycles) |
|---|---|---|---|---|---|---|---|---|---|---|
| 1 | Open | Close | Open | Close | Open | Close | Open | Open | A, B, C | 3 |
| 2 | Close | Open | Close | Close | Open | Close | Open | Open | B, C | 2 |
| 3 | Close | Open | Open | Open | Close | Close | Open | Open | C | 1 |
| 4 | Close | Open | Open | Open | Close | Open | Open | Close | None | 0 |
| 5 | Close | Close | Close | Close | Close | Close | Close | Close | Multi-Path | 0 |

As shown in Table I, switch configuration number 1 includes stages A, B and therefore has a latency of three clock cycles. Switch configuration number 2 includes stages B and C, and has a latency of two clock cycles. Switch configuration number 3 includes stage C, and has a latency of one clock cycle. Switch configuration number 4 includes no stages (i.e., a complete bypass) and has no latencies associated with the data processing channel. Finally switch configuration 5 simultaneously initializes each stage and provides the same data directly to the receiver. In this last configuration, once the stages are initialized the switch configuration could change to, for example, switch configuration number 1 to maximize bandwidth or data throughput. Since the latency is reduced, the transaction is able to begin earlier, and therefore completes earlier. This, in turn, allows subsequent transactions to also begin earlier, resulting in both increased bandwidth and reduced latency for applications that have periods of inactivity between bursts of activity. Note that the switch configurations described in Table I above represent only one particular embodiment. In alternative embodiments, the bypass network 110 can include more or fewer switches arranged in a variety of configurations to bypass one or more stages 108 of a data processing channel 107. These switch configurations can easily be controlled by a state machine that responds to read commands on the control bus.

Figure 7:
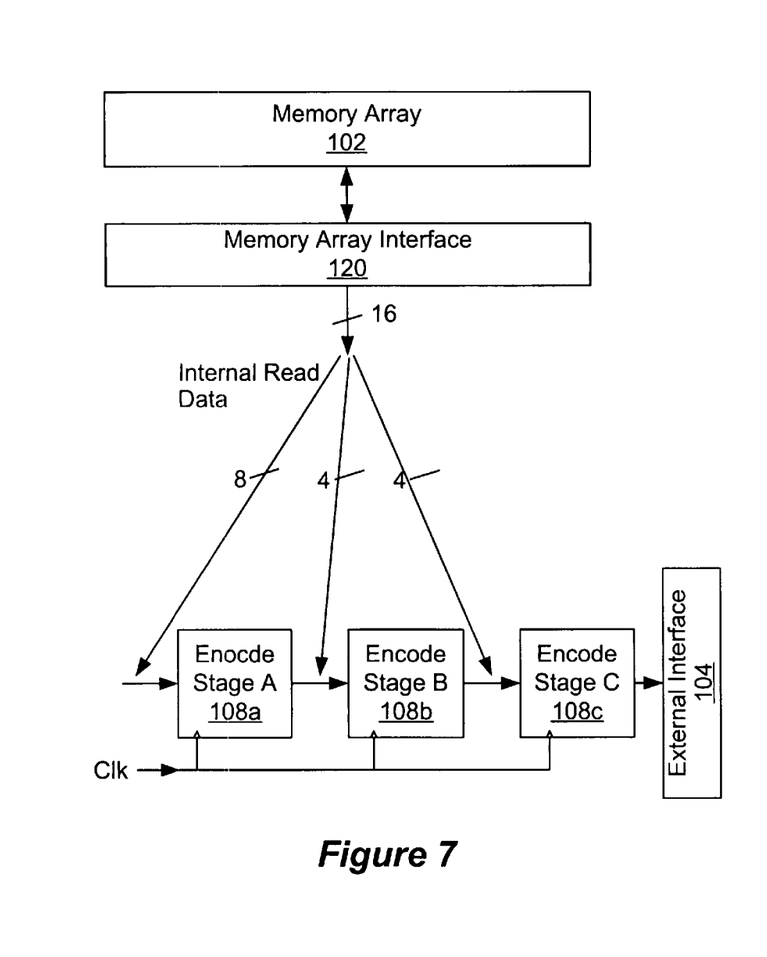
FIG. 7 is block diagram of an embodiment of a memory device with bypass capability.

FIG. 7 shows a memory device, such as a DRAM or SDRAM device, that is configured to fetch more data in a single core access operation than the external interface 104 can deliver in a single cycle of an external data bus. In this example, sixteen bits are retrieved from memory array 102, via memory array interface 120, and become internally available simultaneously. It should be noted that the number of bits of data retrieved by a single access operation may be larger or smaller in other embodiments. If the read pipeline is empty, the sixteen retrieved (read) bits are directed to the various stages of the read pipeline simultaneously. In this example, the memory array provides sixteen bits in a single access operation, Encode Stage C (108c) is loaded with 4 bits of data and then drives this to the external interface 104 in a single clock cycle. Encode Stage B 108b and Encode Stage A 108a are loaded with 4 and 8 bits of data respectively. Encode Stage A 108a performs sufficient encoding to increase the throughput (i.e., the number of bits transmitted per clock cycle) of the external interface 104. The read pipeline is now full, the device has used the two clocks of the external data bus that would have otherwise been unused. Subsequent read operations may continue to keep the read pipeline filled, with all the subsequent read data being routed through Encode Stage A 108a, thereby maintaining the data transmission rate at it highest throughput. Only the initial read operation, started when the read pipeline was empty, utilizes the bypass, since subsequent reads would occur while data is already be in the read pipeline, utilizing Encode Stage B 108b and Encode Stage C 108c.

Figure 8:
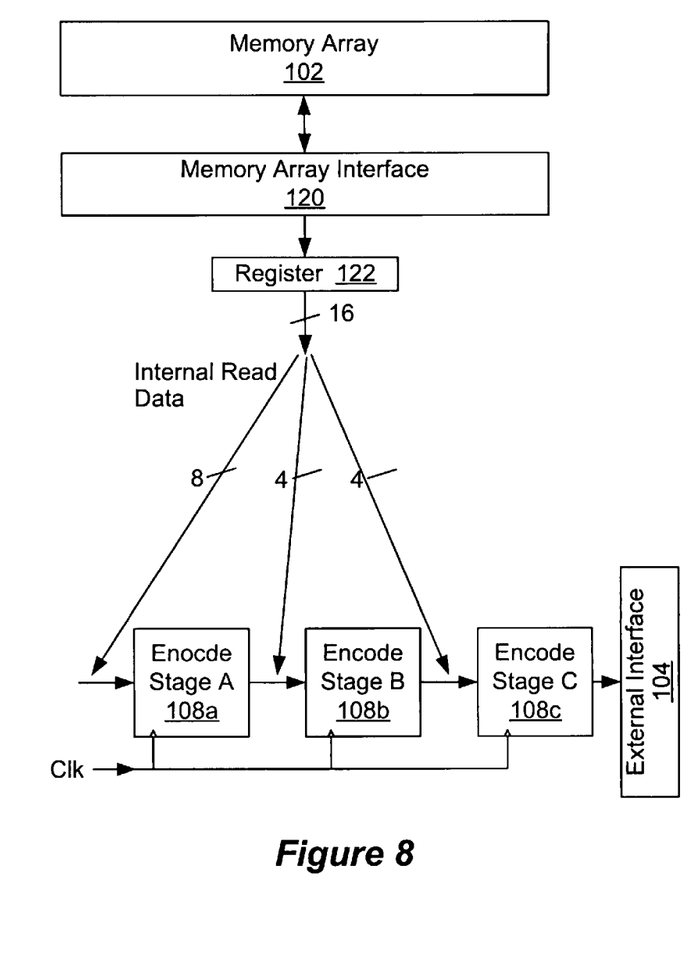
FIG. 8 is block diagram of an embodiment of a memory device with prefetch and bypass capabilities.

FIG. 8 is similar to FIG. 7, except that the memory device includes a prefetch mechanism, including prefetch logic (e.g., part of the memory access controller 106, FIG. 1) and a register 122 that stores data prefetched (via memory array interface 120) from the memory array 102 or core of the memory device.

Memory Controller

Figure 2:
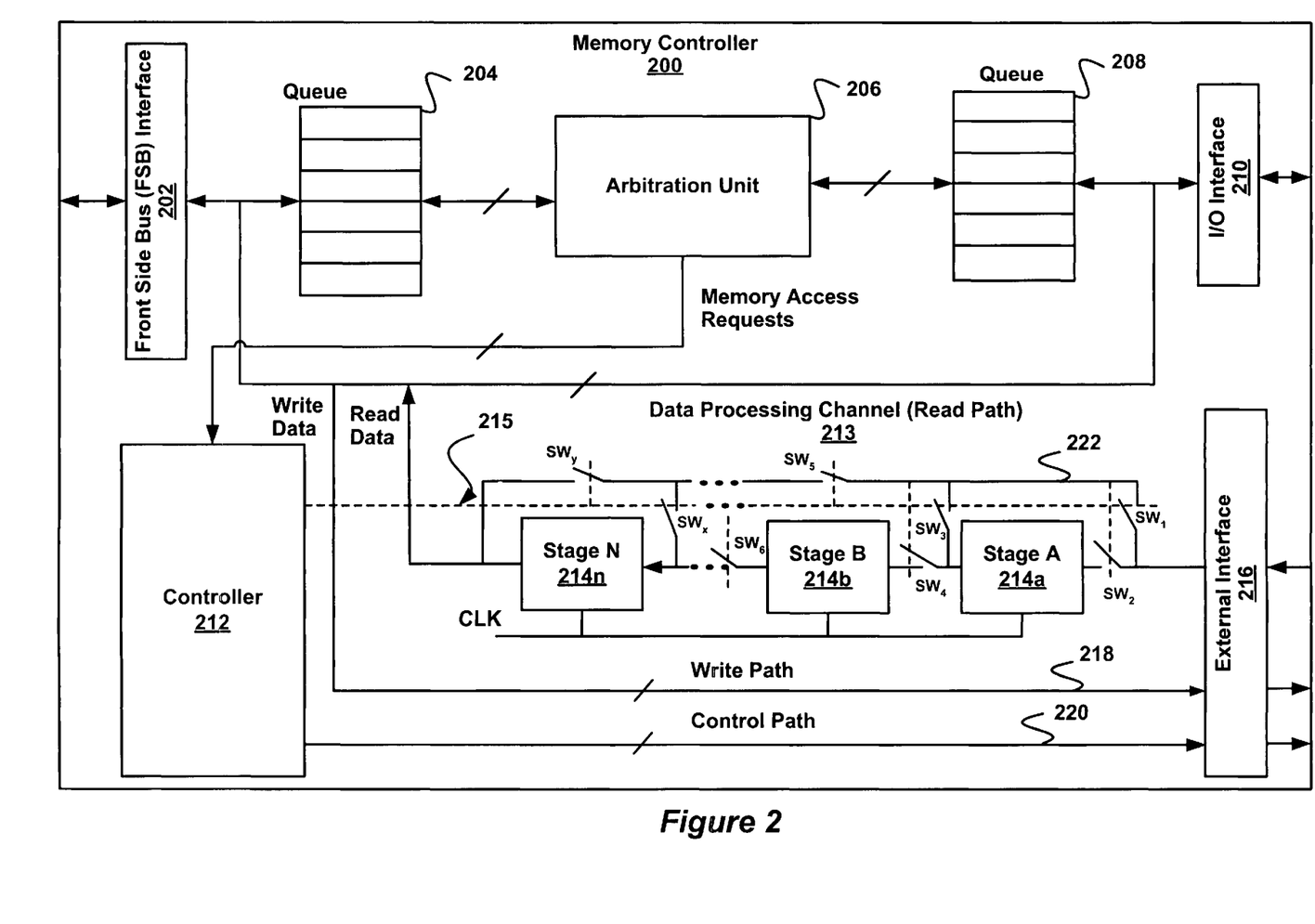
FIG. 2 is a block diagram of an embodiment of a memory controller with bypass capability.

FIG. 2 is a block diagram of an embodiment of a memory controller 200 with bypass capability. The memory controller 200 includes a front side bus (FSB) interface 202, an arbitration unit 206, queues 204 and 208, an input/output (I/O) interface 210, a controller 212, a data processing channel 213 (i.e., read path) and an external interface 216. Memory access requests are received from a CPU or other requestor via the FSB interface 204, and memory access requests are received from an I/O device, or an I/O controller coupled to multiple I/O devices, via the I/O interface 210. The FSB interface 202 and I/O interface 210 include circuitry to provide signal conditioning and to implement communication protocols. The requests from the FSB interface 202 and I/O interface 210 are stored in queues 204 and 208, respectively. The queues 204 and 208 can be implemented in hardware or software, or a combination of both. The queues 204, 208, can have a variety of data structures such as first in first out (FIFO) or last in first out (LIFO) depending upon the architecture of the memory controller 200.

In some embodiments, the CPU or other requestor is located on the same chip or within the same integrated circuit or module as the memory controller 200. In such embodiments, the FSB interface 202 is an internal interface.

The arbitration unit 206 is coupled to the queues 204 and 208 and controller 212. The arbitration unit 206 retrieves memory access requests from the queues 204, 208, and provides them to the controller 212. The arbitration unit 206 includes logic for managing the memory access requests based on a memory request management scheme (e.g., priority, round-robin, etc.). The controller 212 can be a single integrated circuit chip, a chip set, or an embedded processor or memory management unit (MMU).

Write data received from the interfaces 202 and 210 are written to a memory device (e.g., memory device 100) via the write path 218 and external interface 216. Read data is received from the external interface 216 and processed by the data processing channel 213. The external interface 216 includes known devices for conditioning data for transmission on a transmission line or bus in accordance any suitable high-speed bus specification, such as LVT, GTL+, SSTL_2, etc. The control path 220 includes one or more control lines for providing various control information to a memory device, such as memory access requests. In some embodiments, the control path 220 provides one or more switch control signals to the bypass network 110 in the memory device 100 for configuring the bypass network 110 to bypass stages 108a, . . . , 108n, in the data processing channel 107, as described with respect to FIG. 1.

The data processing channel 213 includes one or more processing stages 214a, . . . , 214n, which collectively process the data read from the external interface 216. The data processing channel 213 can be implemented in hardware or software, or a combination of both. In some embodiments, the data processing channel 213 performs signal processing on the data to recover the data, which was previously encoded by the device that transmitted the data. For example, the data processing channel 213 can provide a decoding process for decoding data that was encoded by the data processing channel 107 of FIG. 1. In some embodiments, data decoding could include the recovery of a clock signal using a CDR circuit, which can then be used to sample incoming data in a receiver, as described below with respect to FIGS. 3 and 4.

The data processing channel 213 is coupled to a bypass network 222 including switches $SW_1$, $SW_2$, $SW_3$, $SW_4$, $SW_5$, $SW_6$, . . . , $SW_X$, $SW_Y$. These switches can be selectively activated to bypass one or more stages 214a, . . . , 214n, based on one or more performance criteria (e.g., latency, bandwidth, etc.). In some embodiments, the bypass network 110 is configured to bypass one or more stages 214a, . . . , 214n, in response to a switch control signal 215 generated by controller 212.

In some embodiments, the bypass network 222 is configured using a look-up table (LUT) stored in, for example, cache memory in the controller 212. In other embodiment, the bypass network 222 is configured by a state machine (e.g., in controller 212) that adjusts the switches of the bypass network according to the requests emitted by the arbitration unit 206. By setting the various switches in the bypass network 222, one or more stages 214a, . . . , 214n, are removed from the data processing channel 213. Note that the example switch configurations shown in Table I can be modified (if necessary) so as to bypass stages 214a, . . . , 214n, in data processing channel 213 that correspond to stages 108a, . . . , 108n, bypassed in the data processing channel 107 of memory device 100.

As noted above, in some embodiments a transmitter (e.g., memory device 100) and a receiver (e.g., memory controller 200) can have a predetermined policy for configuring their respective bypass networks 110, 222, based on one or more events. For example, a memory controller might receive memory access requests that specify a particular latency mode of a plurality of predefined latency modes. Alternately, a memory controller 200 might receive memory access requests for which a particular latency mode can be inferred (i.e., determined by the memory controller 200) based either on the request or the state of the memory controller, or the state of the memory device, or some combination of these. Each predefined latency mode represents or corresponds to a respective balance between latency and bandwidth, and furthermore corresponds to a respective encoding level. The determined encoding level and/or latency mode can be communicated by the memory controller to a memory device, which then uses the latency mode and/or encoding level information to configure the switches in its bypass network 110 in response to the request. Similarly, the determined encoding level and/or latency mode is used by the memory controller to configure the switches in its bypass network 222.

Workload Adaptive Transmitters

Figure 3:
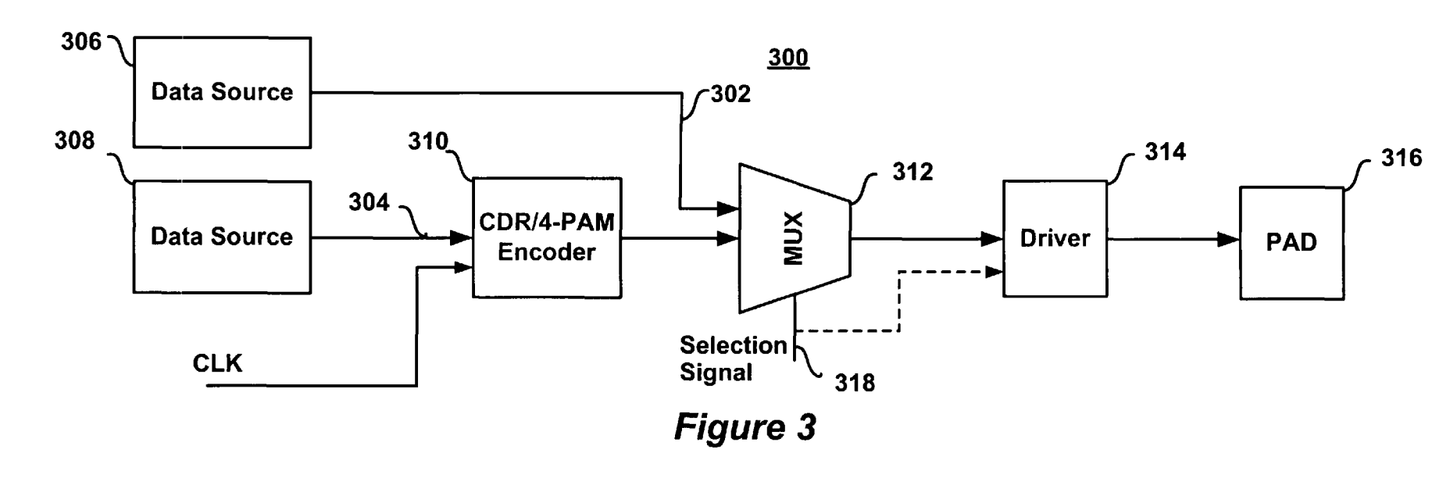
FIG. 3 is a block diagram of an embodiment of a workload adaptive transmitter.

FIG. 3 is a block diagram of an embodiment of a workload adaptive transmitter 300. The transmitter 300 includes a first data processing channel 302 having a first associated latency and a second data processing channel 304 having a second associated latency due to one or more encoding stages. The second data processing channel 304 includes a CDR encoder 310 (e.g., 8B/10B encoder), a selection module 312 (e.g., a multiplexer), a driver 314 and a pad 316. In response to a selection signal 318, the selection module 312 couples a data stream generated by a data source 308 to the CDR encoder 310, which encodes or embeds a clock signal CLK in the data stream. The output of the CDR encoder 310 is coupled by the multiplexer 312 to the driver 314, which drives a data signal on the pad 316. In some embodiments, the data source 308 generates a n-level PAM (e.g., 4-level PAM) encoded non-return-to-zero (NRZ) waveform (e.g., unipolar, polar, Manchester II, etc.). In alternative embodiments, the data source 308 generates a return-to-zero (RZ) waveform (e.g., unipolar, polar, etc.).

In response to a different selection signal 318, the multiplexer 312 couples a data stream from a data source 306 directly to the driver 314 and pad 316, bypassing the CDR encoder 310. In some embodiments, the data source 306 generates a m-level PAM (e.g., 2-level PAM) encoded NRZ waveform. In alternative embodiments, the data source 306 generates an RZ waveform. Data sources 306 and 308 can be separate and independent data sources or the same data source.

The selection signal 318 can be generated by an embedded controller, state machine, or other processing unit to take advantage of unused clock cycles following an idle period. For example, after an idle period the transmitter 300 can send 2-level PAM symbols to a receiver at low latency over the first data processing channel 302. The symbols could be synced with the receiver using an idle pattern containing frequency information. Subsequent clock cycles can then be used by the transmitter 300 to send 4-level PAM symbols over an external link coupled to pad 316 by directing data through a second data processing channel 304 to the CDR encoder 310. In this exemplary system, CDR encoder 310 adds clock recovery information to the data stream on channel 304 (e.g., by using 8B/10B encoding) and prepares it for transmission as a sequence of 4-level PAM symbols, thereby incurring a higher latency than data directed over the first data processing channel 302. To ensure the proper recovery of data at a receiver, in some embodiments the transmitter 300 will send information regarding the nature of the transmitted signal to receiver. For example, the selection signal 318 can be multiplexed in the data stream (dashed line) or, alternatively, information could sent to the receiver over a separate transmission medium. If the Data formatting protocol is predetermined by the transmitter and receiver, then the selection signal need not be sent. For example if the transmitter and receiver are programmed, or designed such that the first datum after a idle period is sent without CDR information, and a second datum is sent with the CDR information, then latency can be further reduced.

While FIG. 3 has been described above as being configured to use a 2-level PAM, low latency data path for transmitting initial data after an idle period, and then switching to a 4-level PAM, higher bandwidth and higher latency data path for subsequent data, in another workload adaptive embodiment the selection between the two data paths may be based on workload. In particular, in a low workload condition, the device or system of FIG. 3 directs a data stream through the low latency data processing channel 302, while in a high workload condition the device or system of FIG. 3 directs a data stream through the high bandwidth, high latency data processing channel 304. The workload condition may be detected by a controller (e.g., 106, FIG. 1, or 212, FIG. 2) of the transmitting device or of the receiving device.

Receiver System

Figure 4:
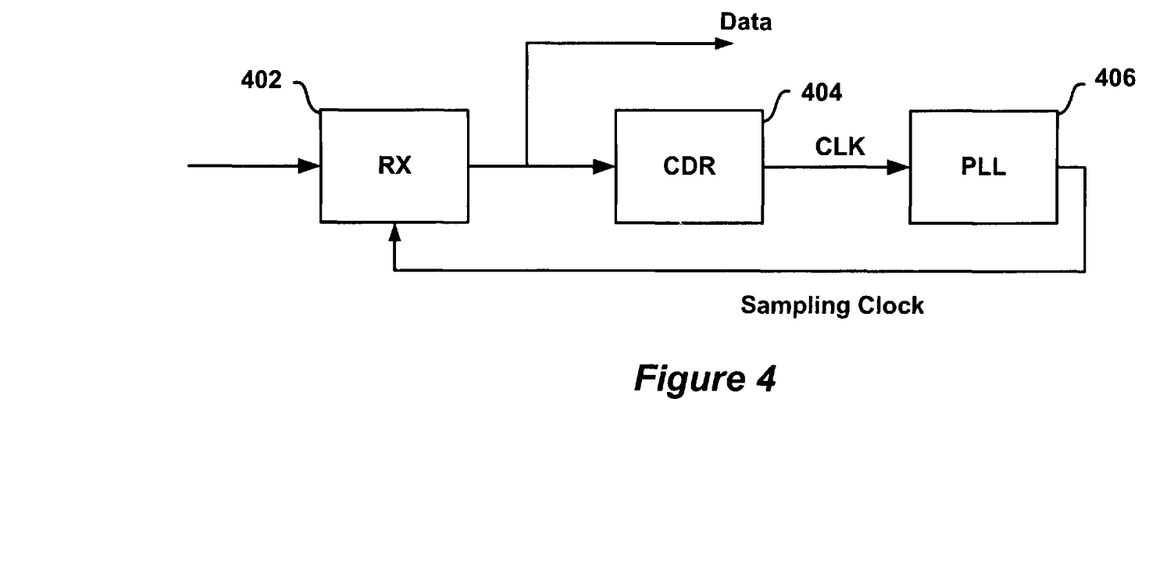
FIG. 4 is a block diagram of an embodiment of a receiver system for receiving data from the transmitter of FIG. 3.

FIG. 4 is a block diagram of an embodiment of a receiver system 400 for receiving data from the workload adaptive transmitter 300 of FIG. 3. The receiver system 400 includes a receiver 402, a CDR circuit 404 and a phase lock loop (PLL) 406. A data stream is received by the receiver 402 and sampled with a sampling clock provided by the PLL 406. The sampling clock is derived by the PLL 406 based the encoded clock signal CLK, which can be recovered by the CDR circuit 404 using known clock recovery techniques. It should be noted that a selection signal can be embedded in the data stream for bypassing or otherwise removing the CDR circuit 404 from the second data processing path 304. Thus, using the previous example, a first portion of the received data that corresponds to clock cycles after an idle period (low latency) and do not include a clock signal CLK are not processed or are ignored by the CDR circuit 404, and a second portion of data (transmitted with higher bandwidth and latency) corresponding to subsequent clock cycles are processed by the CDR circuit 404 to recover the clock signal CLK.

In order to maintain correct phase and clock information during the idle time it may be necessary for the transmitter to transmit a known pattern that contains sufficient clocking information for the receiver to maintain synchronization.

Encoding Process for Transmitter

Figure 5:
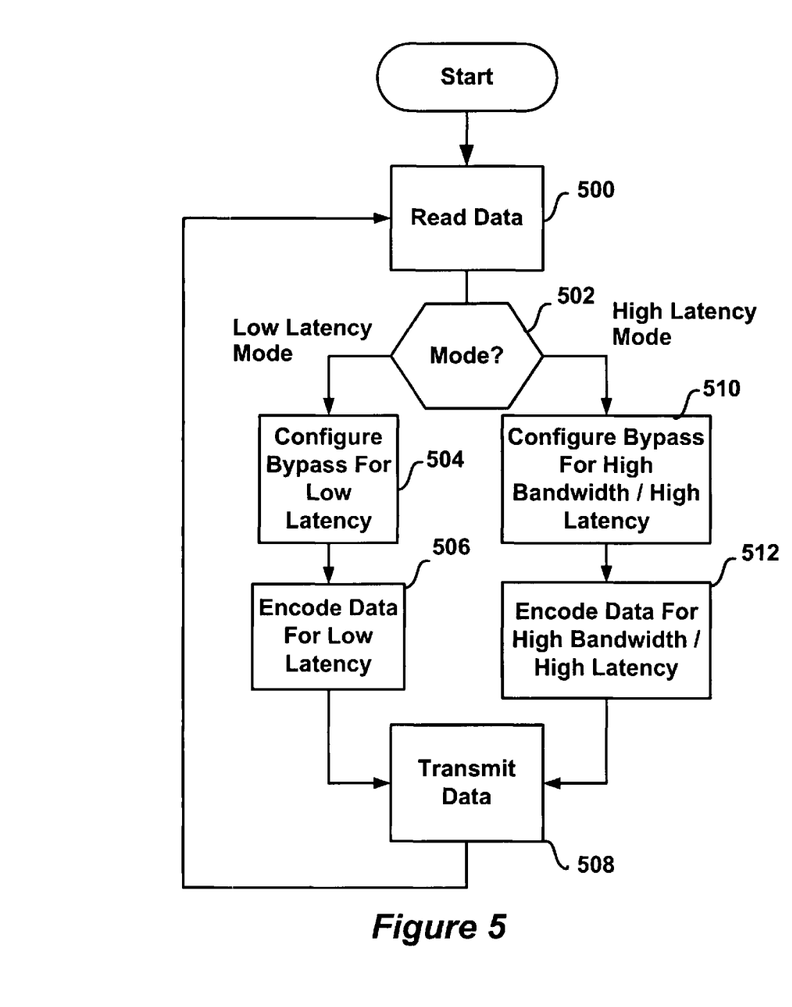
FIG. 5 is a flow diagram of one embodiment of an encoding process for a transmitter in a high-speed data link.

FIG. 5 is a flow diagram of an embodiment of an encoding process for a transmitter in a high-speed data link. The process can be executed by, for example, the memory device 100 of FIG. 1. The process begins by reading 500 data to be transmitted to a receiver. In some embodiments, the data is read from memory or other storage device. In an alternative embodiment, the data is generated by the transmitter. Next the encoding mode (sometimes herein called the latency mode) is determined 502. For example, the memory access controller 106 (FIG. 1) may include idle detection circuitry (e.g., for detecting an idle mode when the read path pipeline is empty). In some embodiments, the memory access controller 106 set the encoding mode in accordance with the state of the read path pipeline. In other embodiments, the encoding or latency mode may be specified by a memory access request that initiated the data encoding process, or by examining the data itself for a mode indicator (e.g., a flag located in the header of a data packet), or by a control signal transmitted by a CPU or other device capable of detecting idle time, or some combination of these. If the transmitter determines that it should use a low latency mode of data transmission 502, then a bypass network is configured 504 to bypass one or more encoding stages in the data processing channel of the transmitter for low latency encoding. For example, all encoding stages could be bypassed to minimize latency. Alternatively, a subset of encoding stages could be bypassed. After the bypass network is configured 504, the data is low latency encoded 506 by the encoding stages, if any, remaining in the data processing channel (i.e., the stages not bypassed). Upon completion of the encoding step 506, the processed data is transmitted 508 to a receiver.

If the transmitter determines that it should use a high bandwidth, high latency mode of data transmission 502, then a bypass network is configured 510 to utilize all or a suitable subset of the stages in the data processing channel of the transmitter for high latency encoding. This set of the stages of the data processing channel may be called the high latency set of encoding stages. After the bypass is configured 510, the data is high bandwidth, high latency encoded 512 by the high bandwidth, high latency set of encoding stages in the data processing channel. Upon completion of the encoding step 512, the processed data is transmitted 508 to the receiver.

Decoding Process for Receiver

Figure 6:
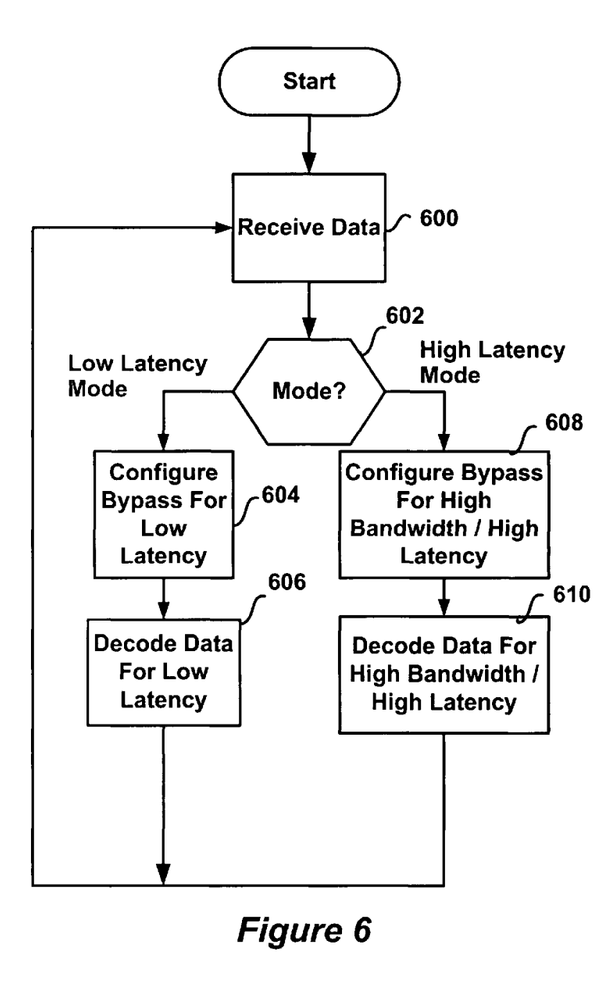
FIG. 6 is a flow diagram of an embodiment of a decoding process for a receiver in a high-speed data link.

FIG. 6 is a flow diagram of an embodiment of a decoding process for a receiver in a high-speed data link. The process can be executed by, for example, the memory controller 200 of FIG. 2. The process begins by receiving data 600 from a transmitter over a high-speed interconnect or other communication medium. In alternative embodiment, the data is retrieved from a buffer or other storage device, where the data may have been stored until the receiver was ready to decode the data. Next, the encoding mode is detected or determined 602. The encoding mode may be indicated, for instance, by the received data, or by a state of the transmitter or receiver, or a combination thereof. If a low latency mode is detected or determined 602, then a bypass network is configured 604 to bypass one or more decoding stages in the data processing channel of the receiver. After the bypass is configured 604, the data is low latency decoded 606 by any decoding stages remaining in the data processing channel, and the process returns to step 600 to receive more data.

If a high bandwidth/high latency mode is detected 602, then the bypass network is configured 608 to utilize all or a suitable subset of the decoding stages in the data processing channel of the receiver for high latency decoding. This set of the stages of the data processing channel may be called the high bandwidth/high latency set of decoding stages. After the bypass is configured 608, the data is then decoded 610 by the high bandwidth/high latency set of decoding stages in the data processing channel.

Devices and circuits described herein can be implemented using computer aided design tools available in the art, and embodied by computer readable files containing software descriptions of such circuits, at behavioral, register transfer, logic component, transistor and layout geometry level descriptions stored on storage media or communicated by carrier waves. Data formats in which such descriptions can be implemented include, but are not limited to, formats supporting behavioral languages like C, formats supporting register transfer level RTL languages like Verilog and VHDL, and formats supporting geometry description languages like GDSII, GDSIII, GDSIV, CIF, MEBES and other suitable formats and languages. Data transfers of such files on machine readable media including carrier waves can be done electronically over the diverse media on the Internet or through email, for example. Physical files can be implemented on machine readable media such as 4 mm magnetic tape, 8 mm magnetic tape, 3½ inch floppy media, CDs, DVDs and so on.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A memory interface, comprising:
    a data processing channel including:
        an interface to receive data from a memory array in response to a memory access request, and
        a plurality of data processing stages to process at least some of the data received from the memory array, the processing including one of encoding and decoding;
    a bypass network coupled to the data processing channel and configurable to bypass at least one data processing stage of the plurality of data processing stages in the data processing channel; and
    circuitry coupled to the bypass network for configuring the bypass network to bypass the at least one data processing stage based on a first latency mode and to not bypass any of the data processing stages based on a second latency mode, the at least one data processing stage that is bypassed including one of an encoding stage and a decoding stage.

2. The memory interface of claim 1, wherein, the bypass network is configured to bypass the at least one stage of the data processing channel to reduce idle latency after an idle period.

3. The memory interface of claim 1, wherein the circuitry configures the bypass network to bypass the at least one data processing stage based on performance criteria, the performance criteria comprising at least one of idle latency, bandwidth or data throughput.

4. The memory interface of claim 1, wherein the bypass network is configured to not bypass any of the data processing stages of the data processing channel to increase data throughput.

5. The memory interface of claim 1, wherein the memory interface is part of a memory device.

6. The memory interface of claim 1, wherein the circuitry configures the bypass network to bypass the at least one data processing stage based on configuration information stored in a look-up table.

7. The memory interface of claim 1, wherein the first mode is one of a plurality of predefined latency modes.

8. The memory interface of claim 1, wherein the data processing channel encodes a first portion of the data using a first format and a second portion of the data using a second format.

9. The memory interface of claim 1, wherein the first latency mode is determined from information contained in the data or information received from a memory controller.

10. The memory interface of claim 1, wherein the bypass network includes a plurality of switches.

11. The memory interface of claim 1, wherein the circuitry includes idle detection logic for detecting the first mode, wherein the first mode reduces latency after an idle mode.

12. The memory interface of claim 1, wherein the first mode is a low latency mode and the second mode is a high bandwidth mode.

13. The memory interface of claim 1, wherein the first mode is a low latency mode in which the circuitry processes 2-PAM encoded data and the second mode is a high bandwidth mode in which the circuitry processes 4-PAM encoded data.

14. A data processing method for a memory interface having a data processing channel that includes a plurality of data processing stages, comprising:
receiving, at the data processing channel, data from a memory array in response to a memory access request;
processing at least some of the data received from the memory array, including one of encoding and decoding the received data, using the plurality of data processing stages of the data processing channel; and
configuring a bypass network coupled to the data processing channel to bypass at least one stage of the data processing channel based on a first latency mode and to not bypass any of the data processing stages based on a second latency mode, wherein the at least one stage includes one of an encoding stage and a decoding stage.

15. The method of claim 14, wherein the first latency mode reduces latency after an idle period.

16. The method of claim 14, wherein the second latency mode increases data throughput.

17. A computer readable storage medium having stored thereon instructions, which, when executed by a processor, cause the processor to perform the operations of:
receiving, at the data processing channel, data from a memory array in response to a memory access request;
processing at least some of the data received from the memory array, including one of encoding and decoding the received data, using a plurality of data processing stages of the data processing channel; and
configuring a bypass network coupled to the data processing channel to bypass at least one stage of the data processing channel based on a first latency mode and to not bypass any of the data processing stages based on a second latency mode, wherein the at least one stage includes one of an encoding stage and a decoding stage.

18. The computer readable storage medium of claim 17, wherein the instructions for configuring the bypass network include instructions for configuring the bypass network to bypass at least one stage of the data processing channel to reduce idle latency after an idle period.

19. The computer readable storage medium of claim 17, wherein the instructions for configuring the bypass network include instructions for configuring the bypass network to include at least one stage of the data processing channel to increase data throughput.

20. A data processing system for a memory interface having a data processing channel, comprising:
means for receiving data from a memory array in response to a memory access request;
means for processing at least some of the data received from the memory array, including one of encoding and decoding the received data, using a plurality of data processing stages of the data processing channel;
means for determining a latency mode; and
means for configuring a bypass network based on the latency mode, wherein the bypass network is configured to bypass at least one stage of the data processing channel based on a first latency mode and to not bypass any of the stages of the data processing channel based on a second latency mode, wherein the at least one stage includes one of an encoding stage and a decoding stage.

21. A computer readable storage medium containing data representing a circuit that includes:
a data processing channel comprising:
an interface adapted to receive data from a memory array in response to a memory access request, and
a plurality of data processing stages that include circuitry for processing at least some of the data received from the memory array, the processing including one of encoding and decoding;
a bypass network coupled to the data processing channel and configurable to bypass at least one data processing stage in the data processing channel; and
circuitry coupled to the bypass network for configuring the bypass network to bypass the at least one data processing stage based on a first latency mode and to not bypass any of the data processing stages based on a second latency mode, wherein the at least one stage includes one of an encoding stage and a decoding stage.

22. An integrated circuit memory device, comprising:
a memory array;
a data processing channel adapted to be coupled to the memory array, the data processing channel including:
an interface adapted to receive data from the memory array in response to a memory access request, and
a plurality of data processing stages that include circuitry for processing at least some of the data received from the memory array, the processing including one of encoding and decoding;
a bypass network coupled to the data processing channel and configurable to bypass at least one data processing stage in the data processing channel; and
circuitry coupled to the bypass network for configuring the bypass network to bypass the at least one data processing stage based on a first latency mode and to not bypass any of the data processing stages based on a second latency mode, wherein the at least one stage includes one of an encoding stage and a decoding stage.

23. The integrated circuit memory device of claim 22, wherein the first mode is a low latency mode and the second mode is a high bandwidth mode.

24. The integrated circuit memory device of claim 22, wherein the first mode is a low latency mode in which the circuitry processes 2-PAM encoded data and the second mode is a high bandwidth mode in which the circuitry processes 4-PAM encoded data.

25. A data processing method for an integrated circuit memory device having a memory interface with a data processing channel, comprising:
in the integrated circuit memory device:
retrieving data from a memory array internal to the integrated circuit memory device data source;
processing at least some of the data received from the memory array, including one of encoding and decoding the received data, using a plurality of data processing stages of the data processing channel; and
configuring a bypass network coupled to the data processing channel to bypass at least one stage of the data processing channel based on a first latency mode and to not bypass any of the data processing stages based on a second latency mode, wherein the at least one stage that is bypassed includes one of an encoding stage and a decoding stage.

26. The method of claim 25, wherein the first mode is a low latency mode and the second mode is a high bandwidth mode.

27. The method of claim 25, wherein the first mode is a low latency mode in which the circuitry processes 2-PAM encoded data and the second mode is a high bandwidth mode in which the circuitry processes 4-PAM encoded data.

* * * * *